United States Patent

[11] 3,619,773

| [72] | Inventor | William M. Lathrop<br>602 Pool Drive, Norton, Kans. 67654 |
|---|---|---|
| [21] | Appl. No. | 926 |
| [22] | Filed | Jan. 6, 1970 |
| [45] | Patented | Nov. 9, 1971<br>Continuation-in-part of application Ser. No. 789,831, Jan. 8, 1969, now abandoned. |

[54] GROUNDING AND TEST DEVICE INCLUDING A GROUNDING STAKE AND TEST LAMP
2 Claims, 7 Drawing Figs.

[52] U.S. Cl..................................................... 324/51,
174/7, 324/133
[51] Int. Cl..................................................... G01r 31/02,
G01r 19/16
[50] Field of Search........................................... 324/51,
72.5, 133, 54, 149; 340/255, 254; 174/7

[56] References Cited
UNITED STATES PATENTS

| 2,422,644 | 6/1947 | Martenet........................ | 324/54 |
| 2,920,273 | 1/1960 | Chruszch........................ | 324/72.5 |
| 3,259,754 | 7/1966 | Matheson........................ | 324/133 X |
| 3,267,452 | 8/1966 | Wolf.............................. | 324/133 X |

OTHER REFERENCES
Tips Tool Catalogue No. 6, published by Tips Tool Co., Inc. received in Patent Office July 7, 1933, pgs. 67, 72 and 73.

*Primary Examiner*—Gerard R. Strecker
*Attorney*—C. B. Messenger

ABSTRACT: An electrical grounding device for use at "on-site" locations to protect mobile equipment and personnel from the hazards of static electricity discharges, lightning or stray currents which provides a grounding stake having an insulated handle to facilitate insertion into the earth or other receptacle, a clip for attachment to the equipment or vehicle to be protected, and a cable interconnecting said stake and clip. Alternate embodiments provide a test lamp with a terminal connected to said cable and a test prong separate therefrom whereby the polarity of connectors is determined for proper equipment connection and useage. The cable itself may also be connected to alternate electrical ground components.

PATENTED NOV 9 1971 3,619,773

INVENTOR.
WILLIAM M. LATHROP
BY C. Messenger
ATTORNEY

INVENTOR.
WILLIAM M. LATHROP
BY
ATTORNEY

GROUNDING AND TEST DEVICE INCLUDING A GROUNDING STAKE AND TEST LAMP

CROSS-REFERENCES TO RELATED APPLICATIONS

The present application is a continuation-in-part of application Ser. No. 789,831 filed Jan. 8, 1969 now abandoned, relating to a Grounding Device.

SUMMARY OF THE INVENTION

Briefly stated, the present invention provides a cable of an electrical conducting type which is provided at one end with an attaching clip that is handily engageable with the structure, frame or grounding post provided on mobile equipment, such as cars, trailers, airplanes, etc. The cable is of substantial length, and the opposite end is attached to a ground stake which may be pushed into the earth or other receptacle adjacent to the vehicle at onsite locations. The grounding device is intended for use to prevent personnel shocks due to a buildup of static electricity in the vehicle or separately to prevent arcing or other electrical discharges that may contribute to fires or other damage to equipment or individuals.

The device further provides a ground connection for the prevention of stray current shocks when the mobile equipment is attached to an onsite power source. In order to provide an efficient ground, the stake has a T-handle to facilitate pressing the stake into the earth. The handle of the stake and, in fact, many additional components of the device may be insulated for the further protection of users.

Separate embodiments of the invention provide a test capability through use of a test lamp connected to the grounding cable. If a ground is first established by application of a stake or by attachment of the ground cable to any other electrical ground, such as a water pipe, a free test prong of the lamp may be used to predetermine the polarity of electrical circuits to which the trailer or vehicle is to be connected. Since many present day trailers, campers, etc. provide a three-prong hookup cable with the third prong being connected to the frame and other established grounds for the vehicle, the test lamp provides means for assuring proper connection of the vehicle circuits to any local power supply in a manner that will preserve the working and safety of electrical components for the vehicle.

A device of the foregoing type is provided to answer certain objects and user requirements. Among such objects is the provision of a device that may be handily carried in a mobile vehicle and that may be easily attached to the vehicle at onsite locations to provide an efficient ground for the vehicle.

Another object of the invention is to provide a device that may be economically built and sold and that may be used to prevent accidents and damage to individual users or equipment.

Further objects and advantages of the invention will be apparent from the appended description and drawings.

DESCRIPTION OF THE PREFERRED EMBODIMENT

Figure 1:
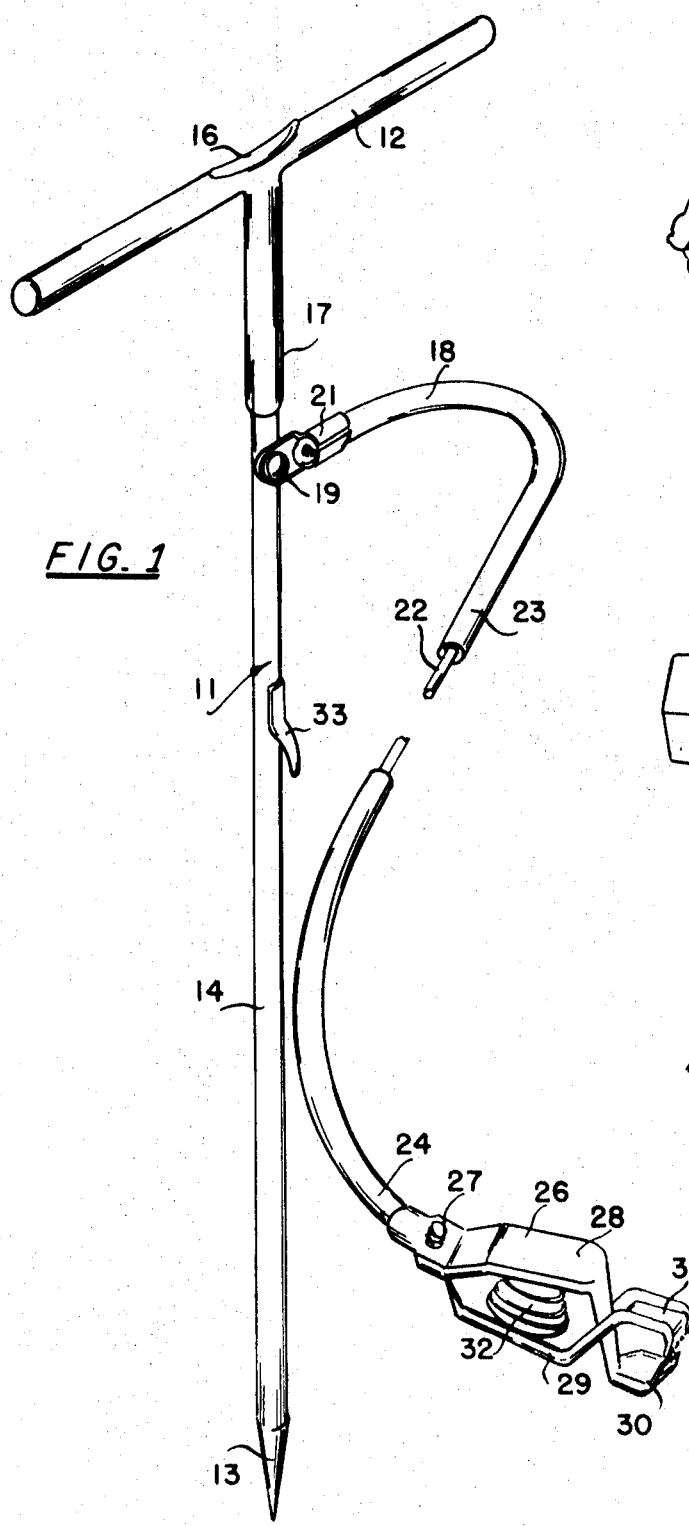
FIG. 1 is a perspective illustration with parts shown in broken detail illustrating a preferred embodiment of the invention.

The preferred assembly shown in FIG. 1 illustrates the essential features of the present invention. A grounding stake 11 is provided with a T-handle 12 and a sharpened end 13. The T-handle 12 facilitates the application of the grounding stake 11 into earth structures. The stake itself is approximately 18 inches long, and, accordingly, the shaft 14 of the stake may be pushed or driven downwardly into the earth a distance sufficient to assure an efficient electrical grounding contact with the earth's soil. In use it is preferred that the grounding stake be applied to a depth where some moisture in the earth structure can be encountered. A striking surface 16 is provided at the junction of the shaft 14 and T-handle 12 to facilitate driving of the stake in difficult soils.

In the preferred form of the invention an insulating cover 17 is applied to the handle 12 so that a user applying the stake or removing the stake will be protected from stray electrical shocks. The insulating cover 17 may be extended over the striking surface 16 as shown or it may be interrupted at such zone to prevent damage to the cover. Durable rubber and plastic type and compounded elastomer insulating covers are available that will withstand substantial impact loadings.

A cable 18 is attached to the stake and the shaft 14 thereof at a position just below the insulating cover 17 by means of a fastener 19 which is engaged through a connector 21. The connector 21 is crimped or otherwise attached directly to the through wires 22 of the cable 18 where insulation 23 is provided on the cable 18. For normal use a substantial length of cable 18 is provided. From 8 to 12 feet of cable length will usually satisfy normal user requirements. The cable shown is, of course, foreshortened and shown in broken section in the present illustration.

The free end 24 of the cable is attached to a clip 26 in order to facilitate engagement of this end of the grounding device with the structure, frame or grounding post of various types of mobile equipment. The clip illustrated has a cable-receiving post 27 and opposed arms 28 and 29 that are attached, respectively, to the jaws 30 and 31. When the arms 28 and 29 are pressed together to compress the spring 32, the jaws 30–31 are opened so that they may be engaged to various metallic and conductive objects on the mobile equipment that is to be protected. Where desired, the clip 26 and the arms 28 and 29 thereof may likewise be insulated by an intimate and bonded cover or by a shield structure of high-dielectric flexible material (not shown).

Figure 2:
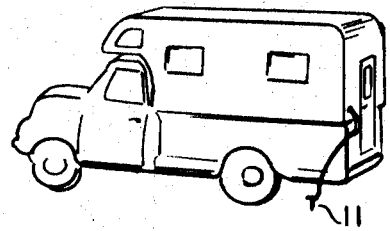
FIG. 2 is a perspective view showing use of the device on a truck camper.
Figure 3:
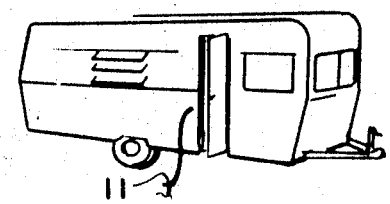
FIG. 3 is a perspective view showing use of the device on a mobile trailer.
Figure 4:
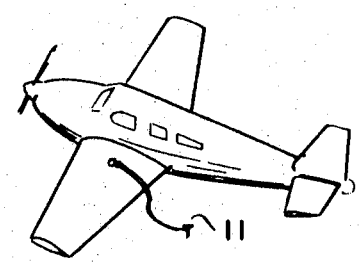
FIG. 4 is a perspective view showing use of the device in connection with aircraft servicing operations.

The described structure may be conveniently carried in automobiles or other vehicles. When the grounding device is to be stored, the cable 18 can be coiled separately, or it may be wound about the T-handle 12 and a finger 33 provided on the shaft 14. Whenever the vehicle has been stopped at an onsite location, the grounding device may be applied in manner as shown in FIGS. 2, 3 and 4. Proper application of the grounding device will avoid user shocks due to static electricity that has built up in the vehicle, and it will further provide a complete and efficient ground for stray currents that may occur if the mobile equipment is attached to a local power source. In similar manner the grounding device will provide a more efficient bypass circuit for lightning or other electrical discharges. Use of the device is especially recommended on mobile home and trailer equipment that is regularly connected to local power sources. With proper internal wiring of the mobile equipment and with use of a grounding device as described, numerous present accidents involving electrical shock to users or damage to the mobile equipment due to fire and explosions can be avoided.

An identical type device can be used beneficially in connection with aircraft. At present many small or outlying fields do not have or provide grounding connections for aircraft that are being stored or serviced. Static electricity buildups have caused many fires and explosions where aircraft are serviced without efficiently grounding the air frame prior to introduction of a servicing nozzle and hose. Other aircraft have been damaged by lightning under circumstances where use of the present grounding device would have avoided or minimized the damage incurred.

The construction of a device that has a protected surface of favorable appearance is facilitated by the use of the insulating cover 17. The prevention of rust and corrosion on the body of the grounding device is highly desirable, It is also preferable to use material stock that already has a protective surface. In general such protective surface would be in part destroyed by welding operations connecting the T-handle 12 to the shank 11. Where an insulating cover 17 is applied the weld junction can be intimately covered and protected by the insulation 17. The chrome or zinc-plated or anodized surface of the remainder of the stake will not be damaged by the welding operations. A further benefit has been noted where a plastisol type of insulation cover is used, The heat introduced in the handle area by welding can be used to activate various types of liquid plastics into which the heated handle is dipped to obtain the desirable insulation cover.

In addition to providing an efficient grounding device will provide a satisfactory answer to the objectives set forth, the present device further provides a unit that can be economically constructed and efficiently stored and used. The preferred embodiment shown has many utilitarian and useful applications in addition to its grounding device uses as described. When the cable is of sufficient electrical capacity, the ground device may be used as a jumper cable to start disabled vehicles and equipment. If the vehicles have similar ground polarity, the frame structures can be brought together and a single grounding device can then be used to complete the circuit necessary to start the disabled unit. Where the cable is of sufficient strength, the device could further be used for towing or tie down purposes.

The device further can provide a grounding device for use with portable and emergency radio equipment. Where radio amateurs and "citizen's band" operators need to establish communications from vehicles at camp sites or other remote locations, a good ground connection from the radio equipment to an earth ground is highly advisable. The present device will provide improved operation and increased safety under such circumstances.

Figure 5:
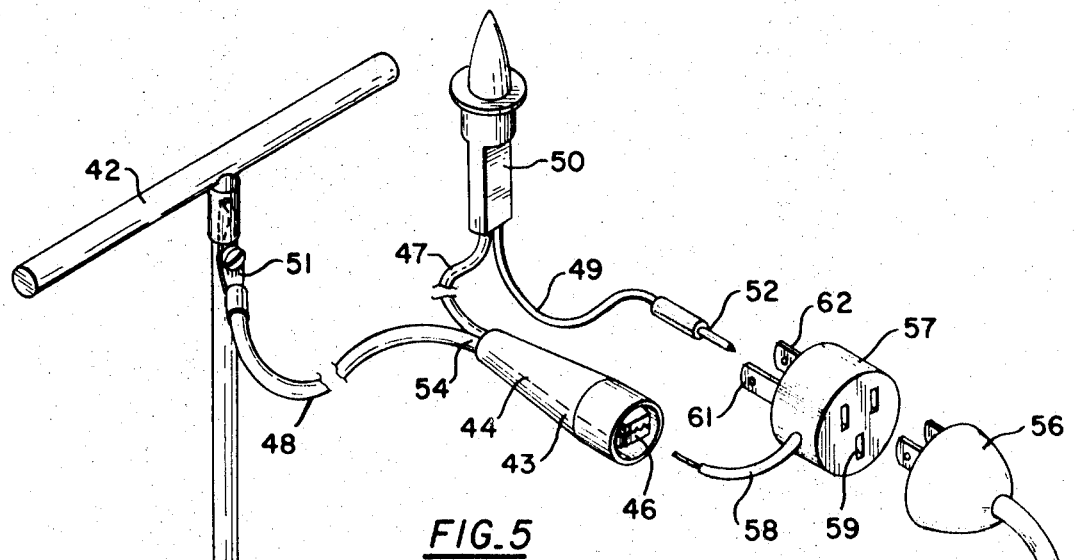
FIG. 5 is a perspective view showing a separate embodiment of the invention inclusive of a test lamp and one manner of use.
Figure 6:
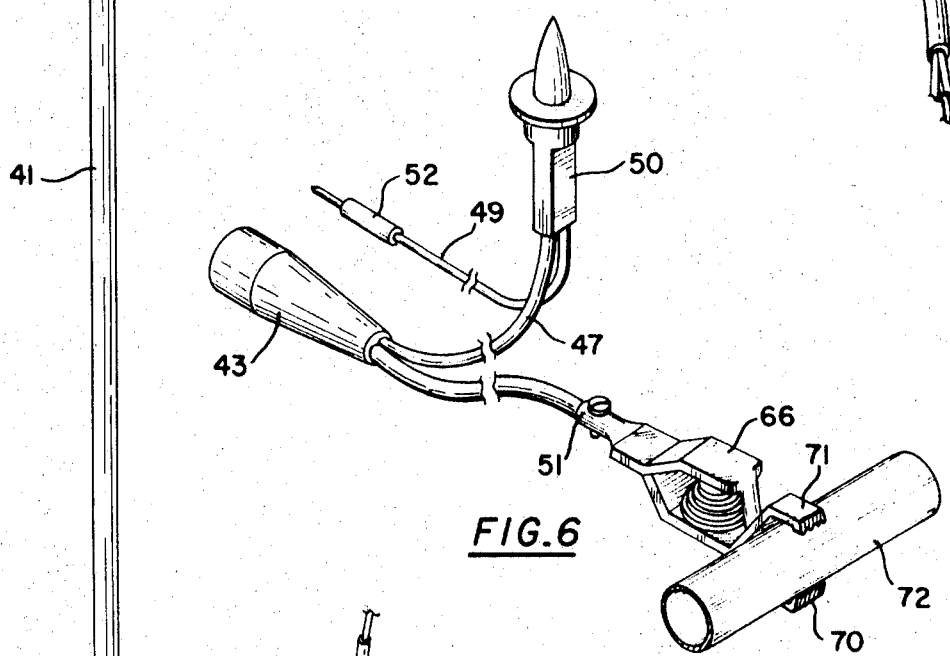
FIG. 6 is a perspective drawing of an alternate grounding device.
Figure 7:
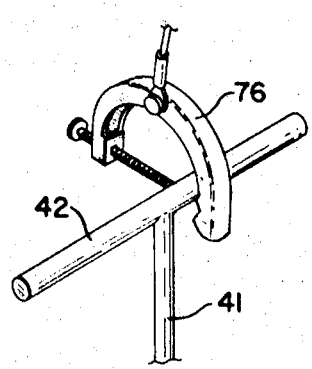
FIG. 7 is a perspective view showing an alternate type of clamp means for use with this invention.

Separate embodiments of the invention are shown in FIGS. 5 through 7. In the FIG. 5 embodiment a stake 41 similar to that of FIG. 1 is provided having a T-handle 42. A cable 48 is attached to the stake 41 by the connector 51. On the free end 54 of the electricity conducting cable a clamp 43 is provided which has an insulating cover 44 protecting the jaws 46. These jaw contacts are connected not only to the conductor of the cable 48 but they are further connected to one leg 47 of a test lamp 50. The opposite leg 49 provides a probe 52. With this arrangement circuits to which the ground cable 48 is to be attached can be first tested to determine if a potential exists in the circuit before a full power conducting connection is made.

If stake 41 is first applied to the ground, a local power circuit can be tested to determine which of the two-prong or three-prong elements provide a desired ground. At many trailer park installations only a two-prong circuit is provided, while most later day trailers have a three-prong power cable supply. When the trailer supply, such as the three-prong plug 56, is to be connected to a two-prong power outlet, a three-prong adapted 57 may be used. On such three-prong adapter a pigtail 58 is connected to the standard ground 59 of the three-prong adapter, and accordingly this pigtail can be engaged to the jaws 46 of the clamp 43 to ground the trailer structure when the trailer has been properly wired to its three-prong supply cable 56.

Testing of the local two-prong plug receptacle (not shown) with the probe 52 will determine which of the two plug openings is the neutral circuit of the power outlet itself. Once this is determined the prongs 61 and 62 may be properly inserted in the local plug power receptacle so that the neutral side of the trailer circuitry will be connected to the neutral side of the local supply. Thereafter the vehicle may be properly connected and all circuits within the trailer will then operate properly. The risk of malfunctions and stray currents due to the incorrect switching of the neutral side of power circuits can be avoided. Through use of the unit shown in FIG. 5 proper connections to local supplies that may have been carelessly wired can be made. Further, an efficient ground for the vehicle frame and structure is provided so that the hazards previously enumerated are avoided.

FIG. 6 provides an alternate arrangement wherein a clip 66 having jaws 70 and 71 is attached to the connector 51 of ground cable 48 instead of being attached to a ground stake 41. The cable 48 is again connected to the clamp 43 and the test lamp 50 as shown in FIG. 5, and the clip 66 may be affixed to a water pipe 72 or to the grounded shielding conduit of a local power source. Where a clip, such as the clip 66 as shown in FIG. 6, or an alternate clamp 76 as shown in FIG. 7, is provided, the cable 48 may be grounded to a local ground element such as pipe 72, or it may alternately be clamped to a ground stake 41 as shown in FIG. 7.

With any of the foregoing arrangements an efficient ground can be obtained that will avoid the substantial hazards of present day operations on the road, at camp sites, or at vehicle and aircraft servicing installations.

I claim:

1. A grounding and test device for frame supported mobile equipment having electrical components and circuits that may be energized by external power sources and wherein said frame and/or a separate circuit purposely provides a grounding component for said equipment that is at times of mobile use at least partially isolated from any earth related electrical ground comprising an electricity conducting cable, a clip at one end of said cable adapted for engaging the grounding component of said equipment, a grounding stake for penetration of an earth surface when said mobile equipment is at a localized site to provide a desired earth related electrical ground, a ground connector at the opposite end of said cable for attachment to said grounding stake, a circuit test lamp for indicating a flow of electricity, an output element for said test lamp electrically connected to said cable and clip, and an input element for said test lamp providing a separate test prong whereby the potential, neutral and ground characteristics of local external power sources and of said mobile equipment may be tested and/or coordinated as the grounding and test device is applied to provide a completed grounding circuit for said mobile equipment.

2. Structure as set forth in claim 1 wherein the grounding stake further comprises an elongated metal shaft, a corrosion inhibiting electricity conducting surface on said shaft, a point on an end of said shaft adapted for penetrating an earth surface, and a handle at an opposite end of said shaft disposed at an angle to said shaft for convenient manual engagement when the device is being installed or removed at places of use, said handle being welded on said shaft whereby the corrosion inhibiting surface at the juncture of said shaft and handle may be destroyed and whereby said handle and shaft are heated by the weld process, and a coating of high dielectric material on said handle and covering said weld for the improved appearance and weather protection thereof and for the electrical protection of users while installing or removing the device.

* * * * *